United States Patent [19]

Narita et al.

[11] Patent Number: 4,873,952
[45] Date of Patent: Oct. 17, 1989

[54] ENGINE CYLINDER HEAD WITH PRECOMBUSTION CHAMBERS USING POROUS CERAMICS INSERT

[75] Inventors: Yoshinori Narita; Mitsuyoshi Kawamura, both of Aichi, Japan

[73] Assignee: NGK Spark Plug Co., Ltd., Nagoya, Japan

[21] Appl. No.: 161,013

[22] Filed: Feb. 26, 1988

[30] Foreign Application Priority Data

Mar. 2, 1987 [JP] Japan .............................. 62-28799[U]

[51] Int. Cl.$^4$ .............................................. F02B 19/16
[52] U.S. Cl. ..................................... 123/270; 123/254; 123/668; 29/156.4 WL
[58] Field of Search ............... 123/270, 271, 254, 668, 123/669, 193 H, 193 CH; 29/156.4 WL

[56] References Cited

U.S. PATENT DOCUMENTS

| | | | |
|---|---|---|---|
| 3,786,795 | 1/1974 | Kaneko et al. | 123/193 H |
| 3,919,755 | 11/1975 | Kaneko et al. | 123/193 H |
| 4,325,334 | 4/1982 | Nishida et al. | 123/270 |
| 4,562,806 | 1/1986 | Gonnord et al. | 123/270 |
| 4,577,600 | 3/1986 | Morita et al. | 123/254 |

FOREIGN PATENT DOCUMENTS 54-16012  2/1979  Japan ................................ 123/254

*Primary Examiner*—Andrew M. Dolinar
*Attorney, Agent, or Firm*—Foley & Lardner, Schwartz, Jeffery, Schwaab, Mack, Blumenthal & Evans

[57] ABSTRACT

The invention relates to a cylinder head for an internal combustion engine in which each combustion chamber has a prechamber. A cast metal body of the cylinder head has recesses each of which provides a prechamber, and a hollow and, for example, bell-shaped member of a porous ceramics is cast-inserted in the inner surface defining each recess. Use is made of a ceramics low in thermal expansion coefficient and heat conductivity, such as aluminum titanate or cordierite, and the porosity of the ceramics is 5 to 50%. Because of its porousness the cast-inserted ceramics member is easily machine-finished. After that, for enhancement of strength and durability, the cast-inserted member of the porous ceramics is impregnated with an inorganic refractory material by using either a solution of, for example, sodium silicate or aluminum phosphate or an aqueous suspension of a ceramics powder, or a mixture of the solution and the suspension.

16 Claims, 1 Drawing Sheet

ENGINE CYLINDER HEAD WITH PRECOMBUSTION CHAMBERS USING POROUS CERAMICS INSERT

BACKGROUND OF THE INVENTION

This invention relates to precombustion chambers in internal combustion engines, and more particularly to a cylinder head with precombustion chambers each of which is provided by inserting a hollow member of ceramics in a recess of a cast metal body of the cylinder head and a method of producing such a cylinder head.

In some internal combustion engines represented by diesel engines each combustion chamber is made up of a main combustion chamber and a precombustion chamber, or simply prechamber, in which combustion is initiated. For the sake of improvements in engine startability, emission controls and/or heat insulation, studies have been made to use ceramics as the wall material for prechambers in a cylinder head. A primitive way is preparing a cast metal body of the cylinder head with generally semispherical recesses and, separately, hollow members of a ceramics good in heat insulation, heat resistance and corrosion resistance and then tightly fitting the ceramics members into the respective recesses of the cast metal body.

Actually, however, the incorporation of the hollow ceramics members encounters problems. In operation of the engine a considerable gradient of temperature is produced between the outer and inner wall faces of the ceramics member for each prechamber, so that the ceramics member is liable to break or crack by thermal shocks attributed to repeated heating and cooling. Also it is likely that the ceramics member is damaged by sharp changes in the pressure in the prechamber during each combustion stroke.

It has been tried to cope with the problem of fragility by selectively using a high-strength ceramics such as silicon nitride ceramics or zirconia ceramics. Besides, cast-insertion of the hollow ceraics members has been employed in casting of the cylinder head with a view to inducing compressive stress in the ceramic members at the stage of their insertion to thereby enhance their endurance to thermal shocks and pressure changes. However, an almoxst inevitable result of the cast-insertion method is degradation of dimensional precision of the inserted ceramics members. Accordingly it is required to correct the induced dimensional errors by machining subsequent to the casting operation, but this is almost impracticable when a high-strength ceramics of the aforementioned class is used since such a ceramics is quite inferior in machinability. Besides, silicon nitride ceramics are considerably high in heat conductivity and, hence, fail to provide a desired degree of heat insulation. In the cast-insertion method it is possible to employ a different ceramics lower in both heat conductivity and hardness than silicon nitride, but still it is not easy to perform machine-finishing of the cast-inserted ceramics member.

SUMMARY OF THE INVENTION

It is an object of the present invention to obviate the above described problems and difficulties by providing an engine cylinder head with precombustion chambers each using a ceramics insert which can easily be machine-finished in the cast-inserted state and exhibits sufficient toughness and durability in actual use of the engine.

According to the invention there is provided a cylinder head for an internal combustion engine, which comprises a cast metal body having at least one recess to provide a precombustion chamber and, for each precombustion chamber, a hollow member which is made of a porous ceramics having a porosity (true porosity as defined hereinafter) in the range from 5 to 50% and is cast-inserted in the inner wall surface of the metal body defining the recess such that the inner surface of the hollow member defines at least a major portion of the precombustion chamber. The cast-inserted hollow member of the porous ceramics is machine-finished and, in that state, is impregnated with an inorganic refractory material.

In producing a cylinder head according to the invention, the cast-inserted and then machine-finished porous ceramics member is impregnated with either a solution of an inorganic refractory material or a suspension of a ceramics powder in a liquid, or a mixture of such a solution and such a suspension, and thereafter the liquid component of the solution or suspension is dissipated from the ceramics member to leave the inorganic refractory material in the pores of the ceramics member.

In the present invention, toughness of the hollow ceramics member used for each prechamber is ensured by inserting that member at the stage of casting the metal body of the cylinder head. Accordingly it is unnecessary to use a hardly machinable high-strength ceramics such as silicon nitride ceramics, and it is possible to selectively use a ceramics high in heat insulating capability, fairly low in thermal expansion coefficient, sufficiently resistant to thermal shocks, easy to cast-insert in casting alloys and relatively low in material cost.

In this invention preferred ceramics are aluminum titanate ceramics and cordierite ceramics. Aluminum titanate has a fairly low coefficient of thermal expansion and good resistance to thermal shocks, and is excellent in heat insulating capability since its heat conductivity is below 1/10 of the heat conductivities of alumina and silicon nitride. In these regards, cordierite is comparable to aluminum titanate.

Usually the cast-inserted holow member of the ceramics needs to be machined to satisfy requirements as to dimensional precision. In the present invention, such machining of the cast-inserted ceramics member is made fully practicable by affording a sufficient porosity to the ceramics insert at the stage of producing the hollow member. The minimum of the porosity is set at 5% because in the case of a lower porosity the post-casting machining becomes impracticably difficult.

The cast-inserted ceramics member is required to have mechanical strength not lower than 2 kg/mm$^2$, but the requirement may not be met when the ceraics has a relatively high porosity for convenience in the post-casting machining. Besides, high porosity of the ceramics insert will be detrimental to durability of the insert because of increased susceptibility to cracking by sharp changes in the combustion pressure and also because of accumulation of carbon and other deposits produced by combustion to the depths of the pores with resultant lowering of the heat-insulating effect and induction of thermal strains, which become an additional cause of cracking, by irregular distribution of temperature.

According to the invention, such demerits of high porisity of the ceraics insert are obviated by first performing machine-finishing of the cast-inserted porous ceramics member to satisfy the requirement as to dimensional precision, and then impregnating the porous ceramics member with at least one kind of inorganic refractory material. Depending on the kind of the employed refractory material either a solution or a suspension is used to accomplish the impregnation, followed by drying and suitable heat treatment. By this treatment the ceramics insert acquires sufficient strength and durability. The maximum of the porosity of the initially cast-inserted ceramics member is set at 50% because when the porosity is more than 50% it is difficult to afford sufficient strength and durability to the ceramics member even by making the aforementioned impregnation treatment.

In a cylinder head according to the invention the hollow member of a porous ceramics for each prechamber can easily be cast-inserted and subsequently can easily be machine-finished to required precision. It is possible to selectively use a ceramics good in heat-insulating capability and resistance to thermal shocks, and the mecahnical strength and durability of the ceramics insert are enhanced by impregnating pores of the insert with a refractory material. At the stage of casting the cylinder head body the hollow ceramics member for each prechamber serves as a core, so that the casting operation is simplified. This invention is readily applicable to industrial production and makes it possible to produce cylinder heads of good and stable quality, and use of a cylinder head according to the invention is effective for improving startability of the engine, which may be a diesel engine for example, and also for accomplishement of improved emission controls.

In the present invention the term "porosity" (of the employed ceramics) always refers to "true porosity". The true porosity of a porous material is given by $V_1/V_2 \times 100$ (%), wherein $V_1$ is the total volume of the pores in a piece of the porous material and $V_2$ is the whole volume of that piece including its pores. Since most of porous materials have both open pores and closed pores, the true porosity of each material is construed as the sum of its open porosity (usually called apparent porosity) and its closed porosity. The apparent porosity of a ceramics is measured by the following method, which is according to JIS (Japanese Industrial Standard) R 2205.

A sample piece of the ceramics having a dry weight $W_1$ is boiled in clean water and then cooled to room temperature. Successively the wet sample is weighed in a state suspended in water. The thus measured weight is represented by $W_2$. After that the wet sample is taken out of water, and water on the surface of the sample is wiped away with a moist cloth well wrung out in advance. The weight of the thus treated sample is represented by $W_3$. From the three measurements of weight the apparent porosity, $P_A$, of the sample is determined by the following equation (1).

$$P_A(\%) = \{(W_3 - W_1)/(W_3 - W_2)\} \times 100 \qquad (1)$$

Furthermore, the true spcific gravity, S, of the same porous material is measured by pulverizing the porous material into fine particles and by using an appropriate instrument such as pycnometer. The closed porosity, $P_C$, of the porous material is determined by the following equation (2).

$$P_C(\%) = [(W_1 - W_2)/(W_3 - W_2) - W_1/\{S \times (W_3 - W_2)\}] \times 100 \qquad (2)$$

Since the true porosity, $P_T$, is the sum of the righthand term of equation (1) and the righthand term of equation (2), the following equation (3) holds.

$$P_T(\%) = [1 - W_1/\{S \times (W_3 - W_2)\}] \times 100 \qquad (3)$$

DESCRIPTION OF THE PREFERRED EMBODIMENTS

Figure 1:
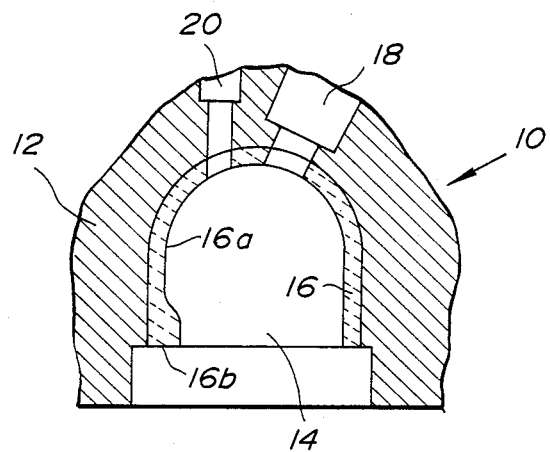
FIG. 1 is a longitudinal sectional view of an unfinished prechamber in a cylinder head according to the invention.

FIG. 1 shows a part of an unfinished cylinder head 10 as an embodiment of the invention. Numeral 12 indicates a body of the cylinder head 10 formed by casting a suitable alloy, and numeral 14 a dome-like recess of the cylinder head body 12. The recess 14 is formed to provide a precombustion chamber. In the depth of the recess 14, a bell-shaped hollow member 16 of an aluminum titanate base ceramics, or a cordierite base ceramics, whose porosity is 5-50% is cast-inserted in the wall face of the alloy body 12. After the casting operation the round inner surface 16a and the annular end face 16b of the hollow member 16 is ground with a suitable machine such as a milling machine to finish the surfaces 16a, 16b precisely into specified dimensions. Besides, a hole 18 for insertion of a fuel injecting nozzle and another hole 20 for insertion of a glow plug bored through the metal body 12 and the hollow ceramics member 16 are mchine-finished.

After machining, the cylinder head 10 in the state shown in FIG. 1 is immersed in a solution of an inorganic refractory material or a suspension of an inorganic refractory material, which is preferably a ceramics powder, in a liquid to thereby impregnate the porous ceramics member 16 in each recess 14. After that the cylinder head is dried and subjected to a suitable heat treatment to thereby completely dissipate the liquid component of the solution or suspension and fix the introduced refractory material in the pores of the ceramics member 16.

Sodium silicate, which is usually used in the form of water glass, and aluminum phosphate are preferred examples of inorganic refractory materials to be used as solution. Preferred examples of ceramics to be used as a powder suspended in a liquid are aluminum titanate, cordierite, alumina and silica. If desired a mixture of two or more kinds of ceramics powders may be used. The liquid component of the suspension may be a solution of an inorganic refractory material. It is suitable to use a powder of the same kind of ceramics as the material of the cast-inserted member 16. In every case it is suitable that the particles of the ceramics powder are smaller than a mean pore size in the porous ceramics member 16. It is rather favorable to perform the impregnation treatment twice or more times for achievement of very good and tight impregnation of the ceramics member 16 with the employed refractory material. The conditions of the aforementioned heat treatment depend on the particulars of the used solution or suspension.

Figure 2:
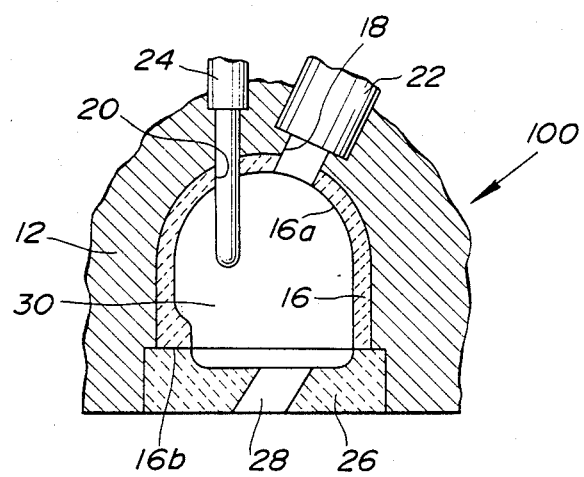
FIG. 2 is a longitudinal sectional view of a finished prechamber in a cylinder head according to the invention.

Referring to FIG. 2, after the above described impregnation treatment of the ceramics member 16 a fuel injecting nozzle 22 is inserted in the hole 18 and a glow plug 24 in the hole 20, and a closure member 26 made of a ceramics such as silicon nitride and formed with a nozzle hole 28 is fitted into the opening region of the recess 14 to thereby complete a cylinder head 100. The space 30 enclosed by the ceramics members 16 and 26 is used as a prechamber of a combustion chamber of a diesel engine.

Several examples of the cylinder head of FIGS. 1 and 2 were produced by varying the porous ceramics material of the hollow member 16 and the way of impregnating the cast-inserted and machine-finished hollow member 16. The cylinder head of every example proved to be fully satisfactory for practical use.

In the first example the hollow member 16 was made of aluminum titanate base ceramics having a porosity of 7%. After machine-finishing the cast-inserted ceramics member 16 the cylinder head 10 was placed in an impregnation tank. In a reservoir tank a solution prepared by mixing 80 parts by weight of a water glass containing 28-30% of $SiO_2$ and 9-10% of $Na_2O$ with 20 parts by weight of water was kept under vacuum for 10 min. Then the water glass solution was put into the impregnation tank to submerge the cylinder head in the solution, and a pressure of 5 kg/cm$^2$ was applied to the solution for 5 min to thereby well impregnate the pores of the ceramics member 16 with the solution. After that the cylinder head was drained and washed with water to remove the surplus solution, followed by drying at 40° C., and then was heated at 120° C. for 2 hr.

In the second example, the hollow member 16 was made of a cordierite base ceramics having a porosity of 50%. For the impregnation treatment after machining the cast-inserted ceramics member 16, a suspension was prepared by first suspending 40 parts by weight a fine powder of cordierite (particles smaller than 5 μm amounted to 85 wt% of this powder) in 60 parts by weight of water and then adding 10 parts by weight of aluminum phosphate to the firstly prepared suspension. With the resultant suspension the ceramics member 16 was impregnated by the same method as in the first example. After drying the cylinder head was heated at 120° C. for 2 hr.

In the third example the hollow member 16 was made of an aluminum titanate base ceramics having a porosity of 15%. Using a colloidal silica suspension in which the concentration of $SiO_2$ was 30%, impregnation treatment of the cast-inserted and mchined ceramics member 16 was performed by the same method as in the first examples. After drying the cylider head was heated at 500° C. for 1 hr.

In the fourth example the hollow member 16 was made of a cordierite base ceramics having a porosity of 20%. Using an alumina sol in which the concentration of $Al_2O_3$ was 20%, impregnation treatment of the cast-inserted and machined ceramics member 16 was performed by the same method as in the first example. After drying the cylinder head was heated at 500° C. for 1 hr.

What is claimed is:

1. A cylinder head for an internal combustion engine, comprising:
    a cast metal body having at least one recess which provides a precombustion chamber; and
    a hollow member which is made of porous ceramics of which porosity is in the range from 5 to 50% and is cast-inserted in the inner wall surface of said cast metal body defining said recess such that the inner surface of the hollow member defines at least a major portion of the precombustion chamber, the cast-inserted hollow member being machine-finished and impregnated with an inorganic refractory material.

2. A cylinder head according to claim 1, wherein the principal component of said ceramics is aluminum titanate.

3. A cylinder head according to claim 1, wherein the principal component of said ceramics is cordierite.

4. A cylinder head according to claim 1, wherein said refractory material comprises a salt selected from the group consisting of sodium silicate and aluminum phosphate.

5. A cylinder head according to claim 4, wherein said refractory material comprises a ceramics powder.

6. A cylinder head according to claim 5, wherein said ceramics powder is a powder of at least one ceramics selected from the group consisting of aluminum titanate, cordierite, alumina and silica.

7. A cylinder head according to claim 1, wherein said hollow member comprises a generally semispherical part.

8. A cylinder head according to claim 7, wherein said hollow member further comprises a generally cylindrical part contiguous to said generally semispherical part.

9. A method of producing a cylinder head for an internal combustion engine, comprising the steps of:
    casting a mtal into a cylinder head body having at least one recess which provides a precombustion chamber with insert of a hollow member made of a porous ceramics of which porosity is in the range from 5 to 50% for each of said at least one recess such that the inner-surface of the cast-inserted hollow member defines at least a major portion of the precombustion chamber;
    machine-finishing the cast-inserted hollow member;
    impregnating the machine-finished hollow ceramics member with a treatment liquid comprising an inorganic refractory material; and
    dissipating the liquid component of said treatment liquid from the hollow ceramics member to leave pores in the hollow ceramics member impregnated with said refractory material.

10. A method according to claim 9, wherein the principal component of said porous ceramics is aluminum titanate.

11. A method according to claim 9, wherein the principal component of said porous ceramics is cordierite.

12. A method according to claim 9, wherein said treatment liquid is a solution.

13. A method according to claim 12, wherein said refractory material is selected from the group consisting of sodium silicate and aluminum phosphate.

14. A method according to claim 9, wherein said treatment liquid is a suspension of a ceramics powder.

15. A method according to claim 14, wherein said ceramics powder is a powder of at least one ceramics selected from the group consisting of aluminum titanate, cordierite, alumina and silica.

16. A method according to claim 14, wherein the liquid phase of said suspension comprises a solution of an inorganic refractory material.

* * * * *